(12) United States Patent
Hickox

(10) Patent No.: US 8,975,865 B2
(45) Date of Patent: Mar. 10, 2015

(54) WIRELESS ELECTRICAL CHARGING SYSTEM RESONATOR HOUSING

(75) Inventor: Jeffrey M. Hickox, Middlefield, OH (US)

(73) Assignee: Delphi Technologies, Inc., Troy, MI (US)

(*) Notice: Subject to any disclaimer, the term of this patent is extended or adjusted under 35 U.S.C. 154(b) by 384 days.

(21) Appl. No.: 13/529,377

(22) Filed: Jun. 21, 2012

(65) Prior Publication Data

US 2013/0038285 A1 Feb. 14, 2013

Related U.S. Application Data

(60) Provisional application No. 61/522,772, filed on Aug. 12, 2011.

(51) Int. Cl.
*H02J 7/02* (2006.01)
*B60L 11/18* (2006.01)

(52) U.S. Cl.
CPC ............ *H02J 7/025* (2013.01); *B60L 11/1829* (2013.01); *Y02T 10/7005* (2013.01); *Y02T 90/125* (2013.01); *Y02T 10/7088* (2013.01); *Y02T 90/12* (2013.01); *Y02T 90/14* (2013.01); *Y02T 90/122* (2013.01)
USPC .......................................... 320/109; 361/600

(58) Field of Classification Search
USPC ......................................................... 320/109
See application file for complete search history.

(56) References Cited

U.S. PATENT DOCUMENTS

| | | | |
|---|---|---|---|
| 4,252,126 A | 2/1981 | Mandl | |
| 4,284,921 A | 8/1981 | Lemonon et al. | |
| 5,473,700 A | 12/1995 | Fenner, Jr. | |
| 5,696,434 A * | 12/1997 | Dennett | 307/71 |
| 6,731,771 B2 | 5/2004 | Cottrell | |
| 6,809,265 B1 | 10/2004 | Gladd et al. | |
| 8,013,569 B2 * | 9/2011 | Hartman | 320/109 |
| 8,824,123 B2 * | 9/2014 | Hickox | 361/600 |
| 2003/0094770 A1 | 5/2003 | Gomez | |
| 2011/0175569 A1* | 7/2011 | Austin | 320/109 |

* cited by examiner

*Primary Examiner* — Sun Lin
(74) *Attorney, Agent, or Firm* — Robert J. Myers

(57) ABSTRACT

A source resonator includes a housing having a convex shape. The source resonator is associated with a vehicular electrical charging system used to electrically charge an energy storage device disposed on a vehicle. The source resonator is adapted for attachment to a ground surface with the convex shaped cover extending outwardly away therefrom. The convex shaped cover of the source resonator, when disposed beneath an undercarriage of a vehicle, fills a space intermediate the source resonator and the undercarriage of the vehicle such that animals, such as a dog or a cat, are discouraged from overlyingly residing thereon. External surface segments of the convex shaped cover depend or slope away from a peak point of the convex shaped cover so that foreign objects, like a soda can or a tool that engage the convex shaped cover, may passively slide off of the housing to ensure optimal performance of the source resonator.

16 Claims, 7 Drawing Sheets

WIRELESS ELECTRICAL CHARGING SYSTEM RESONATOR HOUSING

CROSS-REFERENCE TO RELATED APPLICATION

This application claims the benefit under 35 U.S.C. §119(e) of U.S. Provisional Patent Application No. 61/522,772 filed Aug. 12, 2011.

TECHNICAL FIELD OF THE INVENTION

The invention generally relates to a wireless electrical charging system resonator housing, more particularly, to a housing having a convex shaped cover that passively discourages foreign objects and animals from resting on a source resonator in an electrical charging system.

BACKGROUND OF THE INVENTION

Wireless energy transfer systems are known to incorporate a first resonator structure, hereafter referred to as a source resonator, which includes a coil configured to transfer magnetic energy and a spaced apart second resonator structure, hereafter referred to as a capture resonator that also includes a coil but is configured to receive the wirelessly transmitted magnetic energy. Such a wireless energy transfer system may be used for electrically charging an energy storage device or battery of an electric or hybrid vehicle. In such a system, the source resonator may be located on a ground surface, such as on a floor of a garage or a surface of a parking lot, and the capture resonator may be disposed on a vehicle.

During operation of such a wireless energy transfer system, the vehicle to be charged is parked so that the capture resonator is generally aligned above the source resonator. The capture and source resonators are separated by a distance that approximates a ground clearance of the vehicle which is a typical clearance between the bottom portion of the vehicle's chassis and a ground surface. In some vehicle applications, the ground clearance may be in a range from about 10 centimeters (cm) to 20 cm. In such an arrangement, this ground clearance space between the source and capture resonators is large enough to provide room for small animals, such as dogs and cats, and other possible foreign objects, such as aluminum soda cans or tools to reside. It is desirable to keep such animals and foreign objects out of this space between the aligned capture and source resonators during operation of the wireless energy transfer system, for example to enable maximum energy transfer efficiency from the source resonator to the capture resonator.

Thus, a robustly constructed cover employed on a source resonator is needed so as to discourage animals and foreign objects from coming to rest and overlie the source resonator to ensure maximum energy transfer efficiency in an electrical charging system.

BRIEF SUMMARY OF THE INVENTION

In accordance with one embodiment of the invention a source resonator configured for use with a wireless electrical charging systemis provided. The source resonator includes a base configured to be attached to a parking surface, a convex shaped cover overlying the base and defining a cavity within, and a first wire coil disposed within the cavity and configured to transmit magnetic energy to a second wire coil remote from the first wire coil. A height of an apex of said convex shaped cover is less than a ground clearance height of a motor vehicle to which the second wire coil is mounted.

In accordance with another embodiment of the invention a wireless electrical charging system configured to wirelessly charge a battery in a vehicle having a capture resonator is provided. The wireless electrical charging system includes a source resonator having a base configured to be attached to a parking surface, a convex shaped cover overlying the base and defining a cavity within, and a first wire coil disposed within the cavity and configured to transmit magnetic energy to a second wire coil remote from the first wire coil. A height of an apex of said convex shaped cover is less than a ground clearance height of a motor vehicle to which the second wire coil is mounted. The source resonator also includes a sensor that is configured to detect a metallic object disposed on said convex shaped cover and/or detect a pressure applied to said convex shaped cover. The electrical charging system stops charging the battery when at least one of these conditions is detected by the sensor.

Further features, uses and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

This invention will be further described with reference to the accompanying drawings in which.

DETAILED DESCRIPTION OF THE INVENTION

A source resonator, during operation, may transmit magnetic energy to another capture resonator that receives the transmitted energy. In some embodiments, the source and capture resonators are configured to transfer energy to the vehicle at a sufficiently high rate and may require a physical size of approximately 0.5 meters (m) in length by 0.5 m in width by 3 cm in height. Alternatively, the source and capture resonators may be constructed to wirelessly transmit/receive inductive energy or electrical energy. If the source resonator is disposed on a ground surface and the transmitting resonator remains in operation, heat is generated within the source resonator that may entice an animal, like a dog or cat, to reside on top of or adjacent to a housing of the source resonator so that the dog or the cat may absorbingly enjoy the warmth of the emitted heat. For example, if the dog or the cat decides to reside on top of the warmed resonator, the animal may also further be susceptible to high power magnetic energy during operation of the source resonator. Thus, the transmission of magnetic energy through an animal during operation of the source resonator may negatively affect the animal's health in addition to negatively affecting enable maximum energy transfer efficiency between the source and capture resonators. Alternatively, foreign objects such as soda cans and tools such as a wrench and a screwdriver may drop out of a user's hand and drop to the ground surface so as to come to rest on top of the source resonator. Foreign objects overlying the source resonator may prevent optimum energy transfer between the source and capture resonators. Additionally, if the source resonator transmits a magnetic field, the wrench lying on the source resonator may heat up to an undesired high temperature. For example, the wrench may be undesirably hot to the touch or may melt a source resonator cover. Resonators that do not have maximum energy transfer may result in an electrical charging system that undesirably electrically charges a battery in a greater amount of time that may also have an increased associated energy cost to an operator of the electrical charging system.

Figure 1:
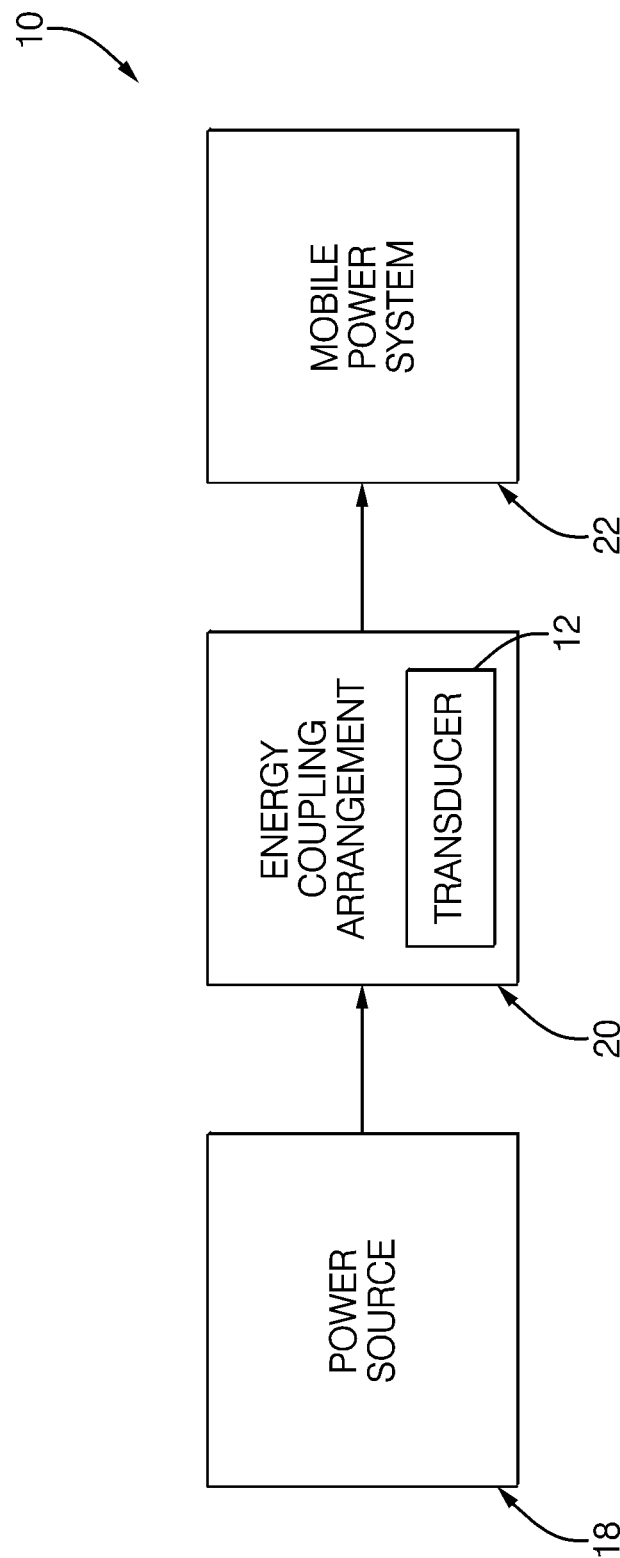
FIG. 1 shows a block diagram of an electrical charging system that includes an energy coupling arrangement that contains a source resonator that has a housing having a convex shape according to the invention.
Figure 2:
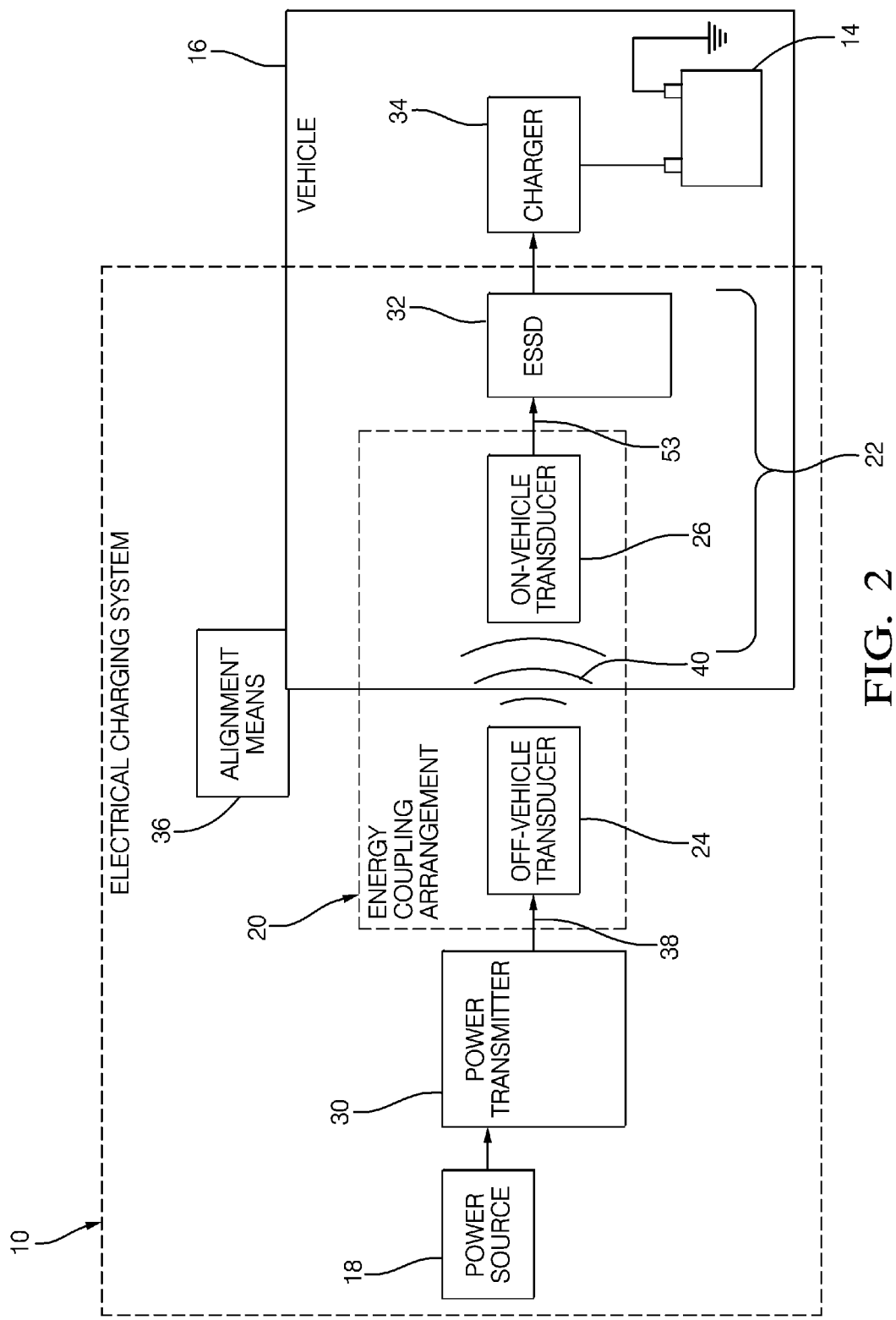
FIG. 2 shows a more detailed block diagram of the electrical charging system of FIG. 1 in which the electrical charging system contains an electrical signal shaping device and the energy coupling arrangement in which the source resonator contains the convex shaped cover.
Figure 3:
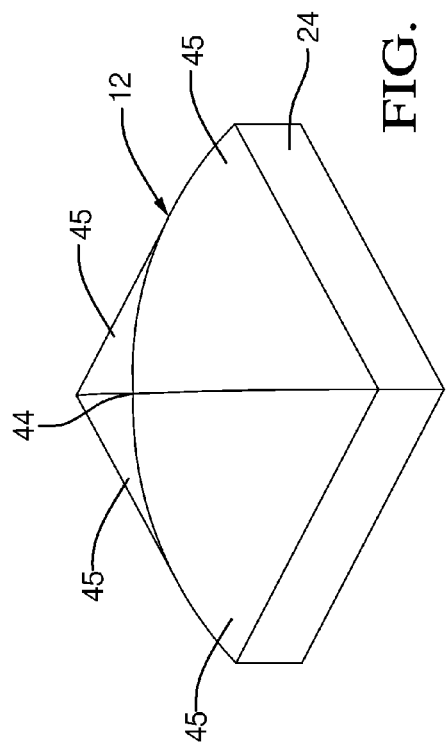
FIG. 3 shows an isometric view of the source resonator having the convex shaped cover of FIG. 2.

Referring to FIGS. 1-3, then, an electrical charging system 10 includes an apparatus, or source resonator 24 that has a convex shaped cover 12 that advantageously discourages an animal or a foreign object (both not shown) from laying on the source resonator especially during operation of electrical charging system 10. Electrical charging system 10 is used to electrically charge an electrical storage device or battery 14 disposed on a vehicle 16. Electrical charging system 10 is formed of electrical circuit components, such as resistors, capacitors, inductors, invertors, switches, relays, transistors, and the like. Battery 14 may include a plurality of batteries that often are associated with electrically charging a hybrid or electric vehicle that assist to power a drivetrain of such vehicles. Electrical charging system 10 includes an energy coupling arrangement 20 and a mobile power system 22. A portion of energy coupling arrangement 20 and mobile power system 22 of electrical charging system 10 are respectively disposed on vehicle 16. Another portion of energy coupling arrangement 20 is disposed external to vehicle 16 and configured to communicate with a power source 18. Energy coupling arrangement 20 includes a first apparatus, or source resonator 24 and a second apparatus, or capture resonator 26 which is configured to receive magnetic energy wirelessly magnetically transmitted by source resonator 24 to electrically charge battery 14. Source resonator 24 is disposed external to vehicle 16 and capture resonator 26 is disposed on vehicle 16. The capture resonator may be employed anywhere on the vehicle and is dependent on the electrical application of use.

Preferably, convex shaped cover 12 is formed of a dielectric material. Convex shaped cover 12 may be formed from a structural foam material that hardens to be a rigid structure. Structural foam molding is similar to injection molding, but the structure may be formed having thicker walls. The plastic is injected into a mold that also has a foaming agent contained therein. Alternatively, the convex shaped cover may be formed of any rigid material. Still yet alternatively, the convex shaped cover may be formed from a non-dielectric material such as metal. In one other embodiment the convex shaped cover is formed of a plastic material, such as nylon or a thermoplastic. Preferably, the material used to construct the convex shaped cover, if driven over with a tire of vehicle 16, does not physically break or damage the housing. This may be especially true when constructing the convex shaped cover of the structural foam material. One type of damage may consist of cracks that form in the housing.

Convex shaped cover 12, as best illustrated in FIG. 3, has spatial form or quality in that the housing occupies physical space over and above the elements used to form source resonator 24. These elements are configured to electrically communicate with a power transmitter 30. Convex shaped cover 12 extends outwardly above and away from these elements. Convex shaped cover 12 is a first housing portion that is attachably mounted to a second housing portion 61. Convex shaped cover 12 and second housing portion 61 combine to surroundingly enclose the elements of source resonator 24. Convex shaped cover 12 at least partially surrounds source resonator 24 when attached with second housing portion 61. Fasteners such as screws and bolts may be used to attach convex shaped cover 12 with second housing portion 61. The second housing portion may be formed from any material, preferably a non-dielectric material. If the second housing portion is formed from a metal material, this may advantageously assist to establish a robust ground plane for the source resonator when the second housing portion is mounted to the ground surface.

If the convex shaped cover is formed of plastic material, a shell may be formed in contrast to the solid fill of a structurally formed foam convex shaped cover. Structural ribs may be used to reinforce the convex shaped cover structure. Alternatively, the convex shaped cover may be formed as a solid plastic cover. The convex shape of the housing allows for easy periodic cleaning of the housing such as when using soap and water with the aid of a soft cloth. Alternatively, the physical size of the convex shaped cover may be any size as necessary to fit the size or shape of the overall shape of the source resonator.

Figure 4:
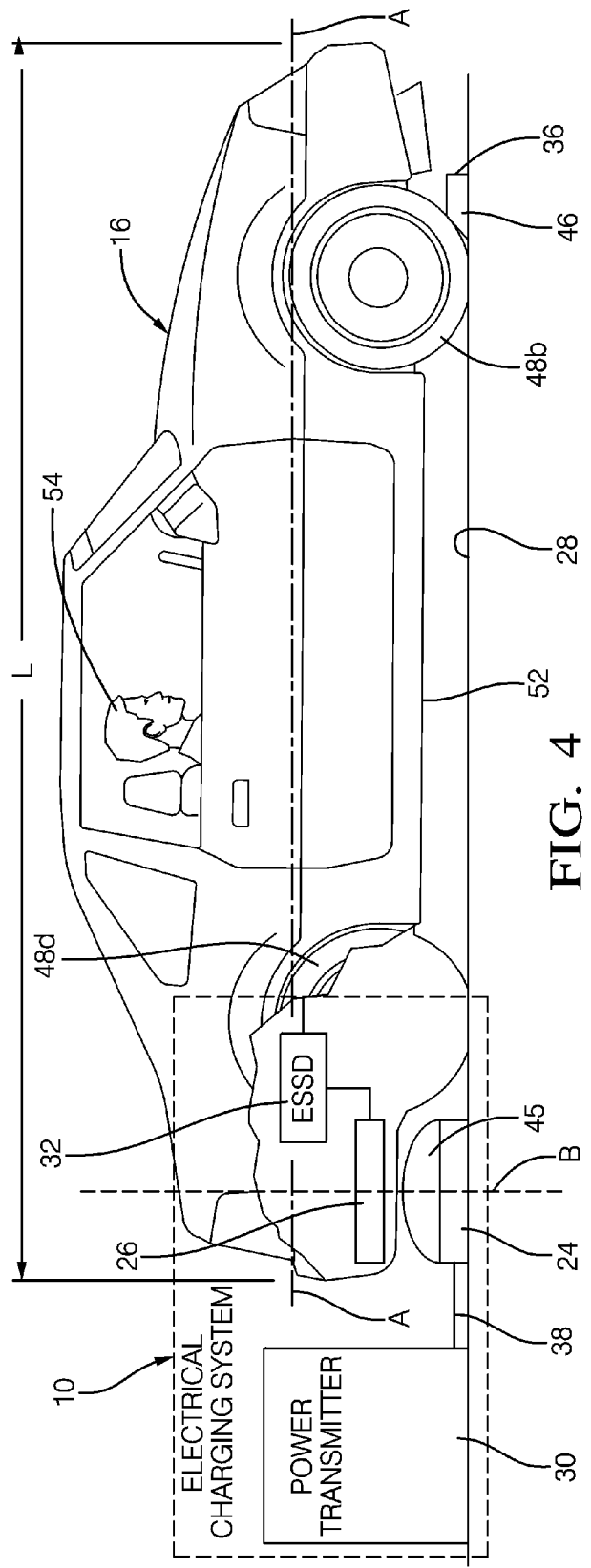
FIG. 4 shows a side view of the electrical charging system of FIG. 2 in which the capture resonator is aligned to overlie the source resonator that contains the convex shaped cover of FIG. 3.

Referring to FIGS. 2-4, source resonator 24 having convex shaped cover 12 is configured for fixed attachment to a ground surface 28. Source resonator 24 is mounted such that spatial form of convex shaped cover extends in a direction moving outward away from ground surface 28. In effect, the spatial form of convex shaped cover 12 is effective to take up, or fill space covered by the convex shaped cover 12. Source resonator 24 may be fixedly secured to ground surface 28 with fasteners such as concrete screws or bolts as is known in the fastening arts. Source resonator 24 is secured to ground surface 28 along second housing portion 61 so that convex shaped cover is physically spaced apart from ground surface 28. Alternatively, the convex shaped cover may be formed to be adjacent the ground surface. Still alternatively, the second housing portion of the source resonator may be secured to the ground surface using adhesive. When source resonator 24 is secured to ground surface 28, secured source resonator may be referred to herein as a source resonator. Preferably, second housing portion 61 is preferably formed of an electrically conducting material, preferably metal. The use of dielectric material for convex shaped cover 12 may further allow for optimal transmission of the magnetic energy out of source resonator 24. If the convex shaped cover were formed from a metal material this may undesirably affect the magnetic transmission performance to the capture resonator. The magnetic energy is generally transmitted up through convex shaped cover 12 towards capture resonator 26. Second housing portion 61 is formed of metal may provide an acceptable electrical ground plane for source resonator 24. Convex shaped cover 12 is configured to overlie, and be remotely disposed from ground surface 28. Convex shaped cover 12 discourages an animal (not shown) from residing thereon when source resonator 24 is disposed beneath vehicle 16. More particularly, convex shaped cover 12 is provided to be an effective animal deterrent when at least a portion of vehicle 16 overlies convex shaped cover 12 of source resonator 24. When the animal does not overlie on convex shaped cover 12, this may assist to ensure optimal efficiency operation between source and capture resonators 24, 26 during operation of electrical charging system 10. The animal may also be less susceptible to exposure to transmitted magnetic energy configured to emit from source resonator 24. If the animal is located at a remote point disposed at an increased distance in a direction moving away from source resonator 24 during operation of source resonator 24, the animal's exposure to transmitted magnetic energy may also be subsequently lessened. Power source 18 provides power to source resonator 24 of energy coupling arrangement 20. Power source 18 and source resonator 24 that includes convex shaped cover 12 are each respectively disposed external to vehicle 16. Convex shaped cover 12 may be constructed as part of source resonator 24 during the manufacture of source resonator 24, such as on a high-speed manufacturing line. Likewise, source resonator 24 may be secured to ground surface 28 by the operator.

Electrical charging system 10 further includes power transmitter 30 and an electrical signal shaping device 32. Power transmitter 30 is disposed intermediate to, and in electrical communication with power source 18 and energy coupling arrangement 20. An output 53 of energy coupling arrangement 20 is in downstream electrical communication with electrical signal shaping device 32. Power transmitter 30 is configured for electrical communication with power source 18 and source resonator 24 that includes convex shaped cover 12. Source resonator 24 is configured for operation when power transmitter 30 is electrically connected with power source 18. Power transmitter 30 supplies the necessary power via a voltage or a current electrical signal 38 to source resonator 24 so that source resonator 24 is configured to wirelessly transmit magnetic energy 40 to capture resonator 26. Capture resonator 26 receives the magnetic energy 40 and converts the received magnetic energy to electrical energy which is further transmitted and electrically shaped by electrical signal shaping device 32 to electrically charge battery 14. Alternatively, the power transmitter may supply an electrical signal to operate the source resonator that is a combination of both voltage and current. A vehicle charger 34, which is further controllable by vehicle 16, receives an output electrical signal from electrical signal shaping device 32. Vehicle charger 34 also produces an output electrical signal that is in downstream electrical communication with battery 14. Electronic devices (not shown) disposed in vehicle 16 may further decide to allow or prevent electrical charging of battery 14 that may further operatively control vehicle charger 34. For example, the vehicular electronic devices may have information that indicates the battery is at a full state of electrical charge and communicate with the vehicular charger to not allow further electrical charging of the battery independent of electrical charging system operation. Capture resonator 26, electrical signal shaping device 32, and vehicle charger 34 are respectively disposed on vehicle 16. Power transmitter 30, in addition to power source 18 and source resonator 24 that includes convex shaped cover 12 as previously described herein, are disposed external to vehicle 16. In one embodiment, the electrical signal shaping device may include a controller/rectifier in electrical communication with an inverter in which the inverter is in downstream electrical communication with a transfer switch. This type of configuration along with other electrical signal shaping device configurations are further described in U.S. patent application Ser. No. 13/450,881 entitled "ELECTRICAL CHARGING SYSTEM HAVING ENERGY COUPLING ARRANGEMENT FOR WIRELESS ENERGY TRANSMISSION THEREBETWEEN" filed on 19 Apr. 2012 and published as U.S. Patent Publication No. 2013/0015812 which is incorporated by reference in its entirety herein. Electrical charging system 10 further includes an alignment means 36 that facilitates the positioning of vehicle 16 so that alignment of capture resonator 26 and source resonator 24 that includes convex shaped cover 12 occurs so that battery 14 may be electrically charged.

The electrical charging system that includes the source resonator that includes the convex shaped cover may also incorporate other features that further enhance safety for the operator of the electrical charging system. One such electrical charging system is further described in U.S. patent application Ser. No. 13/306,327 entitled "POWER SAFETY SYSTEM AND METHOD HAVING A PLURALITY OF THERMALLY-TRIGGERED ELECTRICAL BREAKING ARRANGEMENTS" filed on 29 Nov. 2011 and published as U.S. Patent Publication No. 2013/0134933 which is also incorporated by reference in its entirety herein.

Turning our attention more particularly to FIGS. 3 and 4, a more detailed view of source resonator 24 and convex shaped cover 12 is illustrated. Convex shaped cover 12 is dimensioned large enough to coveringly overlie a length and width of source resonator 24. Convex shaped cover 12 includes a peak point 44 and a plurality of external segment surfaces 45. Plurality of external segment surfaces 45 extend outwardly away from peak point 44. Further, each of the external segment surfaces 45 depends downwardly towards the ground surface when source resonator 24 is mounted to ground surface 28. As best illustrated in FIG. 3, there are four (4) downwardly depending external segment surfaces 45 that transition from peak point 44. And each of the downwardly depending external segment surfaces 45 has a generally negative slope in relation to peak point 44. Thus, convex shaped cover 12 has a rectangular base pyramidal-type shape. This feature allows environmental elements such as water, snow, dirt, and dust, and the like, along with the tools as previously described herein to passively roll off away from convex shaped cover 12 of source resonator 24 where source resonator 24 is disposed. The downward sloping surfaces, with the aid of gravity, assist to ensure environmental elements or other objects roll away from being disposed on convex shaped cover 12 of source resonator 24, thus, minimizing the possibility that these elements and/or tools will restingly lie on convex shaped cover 12 of source resonator 24. Preferably, peak point 44 is co-axially located with a centralized location of source resonator 24. Alternatively, the peak point may be disposed anywhere along the upper portion of source resonator 24. Still alternatively, the convex shaped cover may have any spatial convex shape preferably still having a peak point and the downward depending external segment surfaces. Thus, it is advantageous that convex shaped cover 12 includes an external surface having a plurality of points disposed at a plurality of heights with at least one point in the plurality of points having a first height while the other points in the plurality of points have respective heights that are less than the first height. For example, referring to FIG. 3, peak point 44 is at the first height and the other points in the plurality of points along external segment surfaces 45 are at respective heights that are less than the height of peak point 44.

Convex shaped cover 12 is dimensioned large enough to spread across a majority portion of source resonator 24 so as to effectively discouragingly deter animals from overlying thereon. Convex shaped cover 12 may include through holes (not shown) so that convex shaped cover 12 is attachably secured to second housing portion 61 by fasteners (not shown) received in the through holes. The fasteners may include screws, nuts and bolts, rivets, and the like.

Figure 5:
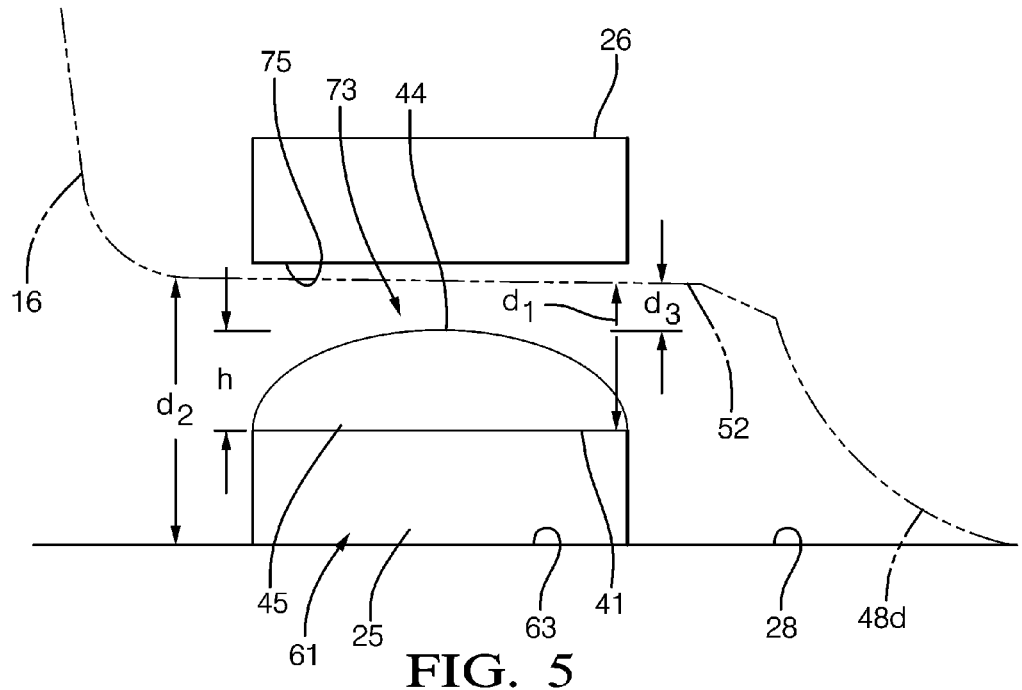
FIG. 5 shows a magnified view of the relationship between the source resonator with the convex shaped cover and the capture resonator of the electrical charging system of FIG. 4, and details thereof.

Referring to FIGS. 3-5, the relationship of source resonator 24 that includes convex shaped cover 12 and capture resonator 26 is better illustrated. A length L of vehicle 16 is disposed along a longitudinal axis A. Vehicle 16 is positioned, so that when parked, capture resonator 26 has a spaced relationship with, and substantially axially overlies source resonator 24 along a longitudinal axis B. Axis B is disposed so as to be transverse to axis A. Referring to FIG. 5, vertical distances $d_1$, $d_2$, $d_3$, and a height h of convex shaped cover 12 are illustrated. Distances $d_1$, $d_2$, $d_3$, and a height h are all axial distances in relation to axis B. Distance $d_2$ is a greater distance than distances $d_1$, $d_3$ and height h, respectively. Distance $d_1$ is a distance from base portion 41 of convex shaped cover 12 to chassis, or undercarriage 52 of vehicle 16. Distance $d_2$ is a distance from ground surface 28 to undercarriage 52 and distance $d_3$ is from peak point 44 of convex shaped cover 12 to undercarriage 52. Distance $d_3$ identifies the height of a space 73 intermediate undercarriage 52 and peak point 44. Height h is measured from a bottom or base portion 41 of convex shaped cover 12 to peak point 44. Distance $d_2$ generally defines a ground clearance space that is intermediate undercarriage 52 and ground surface 28. The ground clearance space is about the same distance $d_2$ along length L of vehicle 16, as best illustrated in FIG. 4. Another definition for ground clearance may be the amount of space between the lower most hanging part of the vehicle's undercarriage and the flat ground surface. Convex shaped cover 12 is effective to keep animals out of space 73 when undercarriage 52 overlies convex shaped cover 12 disposed on source resonator 24, especially when capture resonator 26 directly overlies source resonator 24. A height of the source resonator that includes the other elements that make up the source resonator may also need to be taken into consideration for the correct sizing of the height of the housing to the peak point in any application where the convex shaped cover is utilized. In some other alternative embodiments, a lower surface of the capture resonator may hang below a lower surface of the undercarriage so as to have a distance from the ground surface that may be less than $d_2$. In this type of application, the source resonator and/or convex shaped cover needs to be sized to ensure that when at least a portion of the source and capture resonators overlie one another, animals are prevented from entering this space in-between the source and capture resonators. Thus, the convex shaped cover is effective to fill a space intermediate the ground surface and the undercarriage of a vehicle so as to discouragingly keep either animals and/or foreign objects from entering this space and overlying the source resonator 24.

Capture resonator 26 is mounted on vehicle 16 in a manner so that a planer external surface 75 of capture resonator 26 is at least level with a lower external surface of undercarriage 52. Capture resonator 26 may be mounted to the vehicle's undercarriage using fasteners and bolts. Alternatively, the external surface of the on-vehicle may be non-planar. The lower surface of the undercarriage is that surface that is located closest to the ground surface generally along length L of vehicle 16. Alternatively, capture resonator 26 may be recessed within undercarriage 52 so that the lower external surface of the capture resonator may be disposed at a distance greater than distance $d_2$. As best illustrated in FIG. 4, vehicle 16 is positioned by a driver 54 so that capture resonator 26 substantially axially overlies source resonator 24 along axis B. Driver 54 uses alignment means 36 which includes a wheel chock 46 to assist at arriving of the correct positioning of vehicle to ensure substantial alignment of source and capture resonators 24, 26. Wheel chock 46 is positioned so that tire 48*b* of vehicle 16 engages wheel chock 46. Alternatively, a plurality of wheel chocks may be used at more than one of the tires 48*a*-48*d* of vehicle 16. Wheel chock 46 may be formed from any type of solid material such as plastic, wood, or metal. For example, the wheel chock may also be commercially available for purchase at an auto supply store. In many embodiments, the driver may also be the operator that governs operation of the electrical charging system. Still alternatively, the source resonator may not completely underlie the source resonator, yet still be effectively positioned one-to-another to communicate magnetic energy there between. In some other alternative embodiments, the source resonator may not underlie the capture resonator, yet still underlie the undercarriage of the vehicle and yet still be effectively to transmit/receive magnetic energy one-to-another. Alternatively, the driver may utilize other alignment techniques/technologies that allow for alignment of the source and capture resonators.

Height h of convex shaped cover to peak point 44 needs to be fabricated dependent on the vehicle application of use so that animals are deterred from entering the space 73. When capture resonator 26 is mounted on vehicle 16, as illustrated in FIG. 5, with external surface 75 being level with or recessed axially away from a lower surface of undercarriage 52, distance $d_3$ is maintained across length L of vehicle 16. Height h is selected so as to especially keep at least a portion of the animal's body, or torso from overlying the convex shaped cover. In an alternative embodiment, if the capture resonator is attached to the undercarriage so as to protrudingly extend below the lower surface of the undercarriage along length L so that the lower external surface of the capture resonator is disposed closer to the ground surface, the height of the peak point would need to be effectively sized in relation to the protruding capture resonator. For example, distance $d_2$ may be in a range from about 10 cm to about 25 cm for a vehicle as previously described in the Background herein, and distance $d_3$ may be about 2 cm less than the $d_1$ distance. The appropriate height h for peak point, then, may be ascertained, or determined. It has been observed that $d_3$ being about 2 cm less than the selected $d_1$ distance may be sufficient clearance for the vehicle to be positioned so as to easily overlie the convex shaped cover, but small enough so that an animal's body would not get in the space intermediate the convex shaped cover and the capture resonator. Advantageously, the peak point has sufficient height so as to effective fill the space intermediate the source and capture resonators 24, 26 yet remain obstructingly free from making contact with the undercarriage within the ground clearance of the vehicle during normal operation of the vehicle and the convex shaped cover. Alternatively, trucks may require distance $d_2$ to have a range that is greater than 25 cm as trucks generally have an increased ground clearance in contrast to that of a vehicle.

Convex shaped cover 12 is generally not being used in electrical charging system 10 when convex shaped cover 12 is not attached to source resonator 24. Convex shaped cover 12, when attached with source resonator 24, is generally not in use if source resonator 24 is not secured to ground surface 28 and/or if source resonator is not in electrical communication with power transmitter 30.

Figure 6:
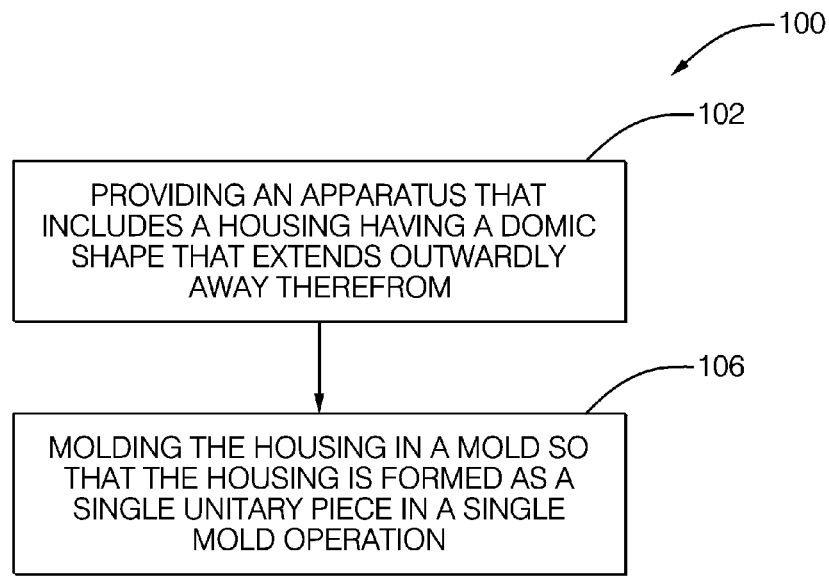
FIG. 6 shows a method of using the source resonator having the convex-shape housing associated with the electrical charging system of FIG. 2.

Referring to FIG. 6, a method 100 more particularly captures when convex shaped cover 12 is being used in electrical charging system 10. One step 102 in method 100 is providing source resonator 24 that includes convex shaped cover 12 that extends outwardly away therefrom. While convex shaped cover 12 is now functional, convex shaped cover 12 is more useful once source resonator is securely mounted to ground surface 28 and electrically connected to power transmitter 30 and power transmitter 30 further connected to power source 18. Convex shaped cover 12 is best used to discourage animals when source resonator 24 is operational to transmit magnetic energy and is disposed underneath undercarriage 52. Providing step 102 further includes step 106 of method 100 which is molding convex shaped cover 12 in a mold so that convex shaped cover 12 is formed as a unitary piece in a single mold operation in a manufacturing assembly process. Step 106 is useful when the convex shaped cover is formed from the structured foam or plastic material.

Figure 7:
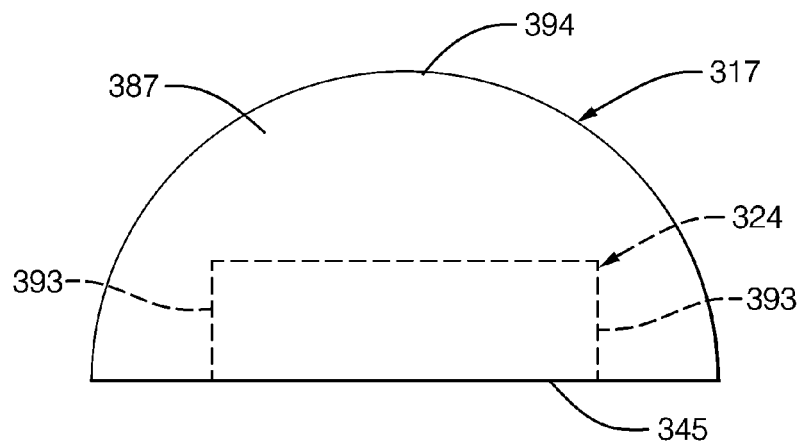
FIG. 7 shows an source resonator containing an convex shaped cover that surrounds a majority portion of the source resonator, according to an alternative embodiment of the invention.

Referring to FIG. 7, according to another alternative embodiment of the invention, a source resonator 324 includes sidewalls 393 that also each have external surfaces. A convex shaped cover 317 includes a peak point 394. A convex portion 387 surrounds a majority portion of source resonator 324 including sidewalls 393. Only bottom external surface 345 disposed adjacent the ground surface is not covered by convex shaped cover 317. Convex shaped cover 317 advantageously serves to assist to deter animals from lying along top external surface 344 or sidewalls 393 of source resonator 324. Alternatively, the sidewalls may not be present; rather the elements of the source and capture resonator may be disposed in a space bounded by the convex shaped cover and a base portion of the convex shaped cover.

Figure 8:
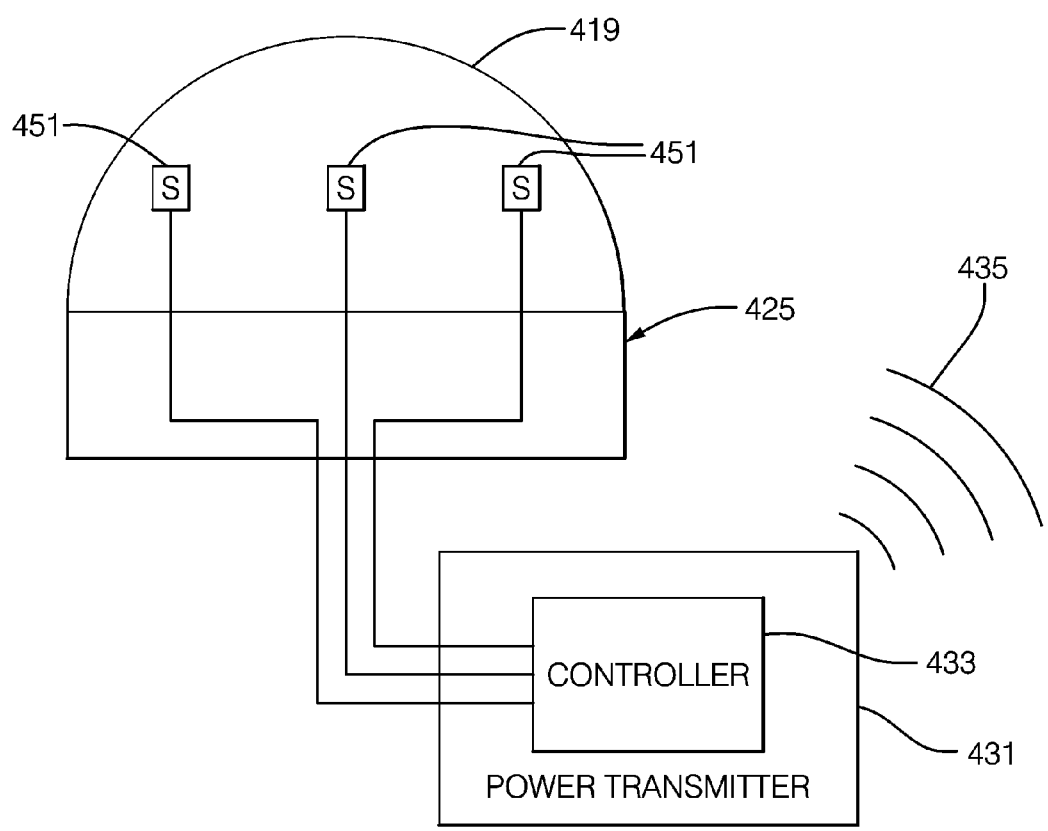
FIG. 8 shows an source resonator that contains a convex shaped cover having at least one sensor contained therein, according to another alternative embodiment of the invention.

Referring to FIG. 8, according to a further alternative embodiment, at least one sensor 451 is in communication with convex shaped cover 419. When the convex shaped cover is constructed of the structural foam material, as previously described herein, openings may be defined in the foam to fit the sensors and the corresponding wire conductors the electrically connect with the sensors. The wire conductor may be wired through the source resonator as well as be disposed external to the source resonator. Convex shaped cover 419 overlies source resonator 425 when source resonator 425 is securely mounted to a ground surface. Sensor 451 is in electrical communication with a controller 433 disposed in power transmitter 431. Power transmitter 431 may wirelessly communicate a status signal 435 to other circuit elements or electrical devices in the electrical charging system or the vehicle such that, if the sensors are activated by an animal or foreign object that movingly disturbs or otherwise puts pressure on the convex shaped cover, the electrical charging system is configured to stop the electrical charging system from electrically charging the battery. In one embodiment, the sensors may be formed of small wire windings that are especially useful in detecting metallic foreign objects, such as the wrench or the soda can. Should a metallic object reside in the vicinity of the wire winding sensors, a change in inductance of the windings indicates a metallic object. The data provided by the sensors may be used by the controller to ensure safe operation of the electrical charging system. In one embodiment the sensor may be a pressure sensor type sensor. In another embodiment, the sensors may be inductive coil type sensors.

Referring to FIGS. 9A and 9B, a top and bottom view, respectfully, is illustrated of a convex shaped cover 501 having an inverted V-type shape. As such, the top view of the convex shaped cover appears like a rooftop of a home. Convex shaped cover 501 has a peak 504 that extends along convex shaped cover 501. Downward-sloping exterior surfaces 505 extend from peak 504 into a perimeter lip 502. Lip 502 contains openings 503 that receive fasteners (not shown) to secure housing to the second housing portion of a source resonator. Lip 502 also construes a base portion of convex shaped cover 501 being the part of convex shaped cover 501 that is most remote from peak 504. Sidewalls 507 and support ribs 508 support downward sloping surfaces 505. This is especially useful if the housing is formed of structural foam and a tire drives over the housing in a manner so that damage is not incurred to the housing. An input/output port 506 receives wire conductors therein to connect the source resonator to the power transmitter as further described in the embodiment of FIG. 4. Referring to FIG. 9B, the bottom view further shows the detail of a plurality of support ribs 508, preferably spaced a same distance apart along a length of the convex shaped cover. Alternatively, a similar rib structure may be employed in the embodiment of FIG. 3.

Figure 10:
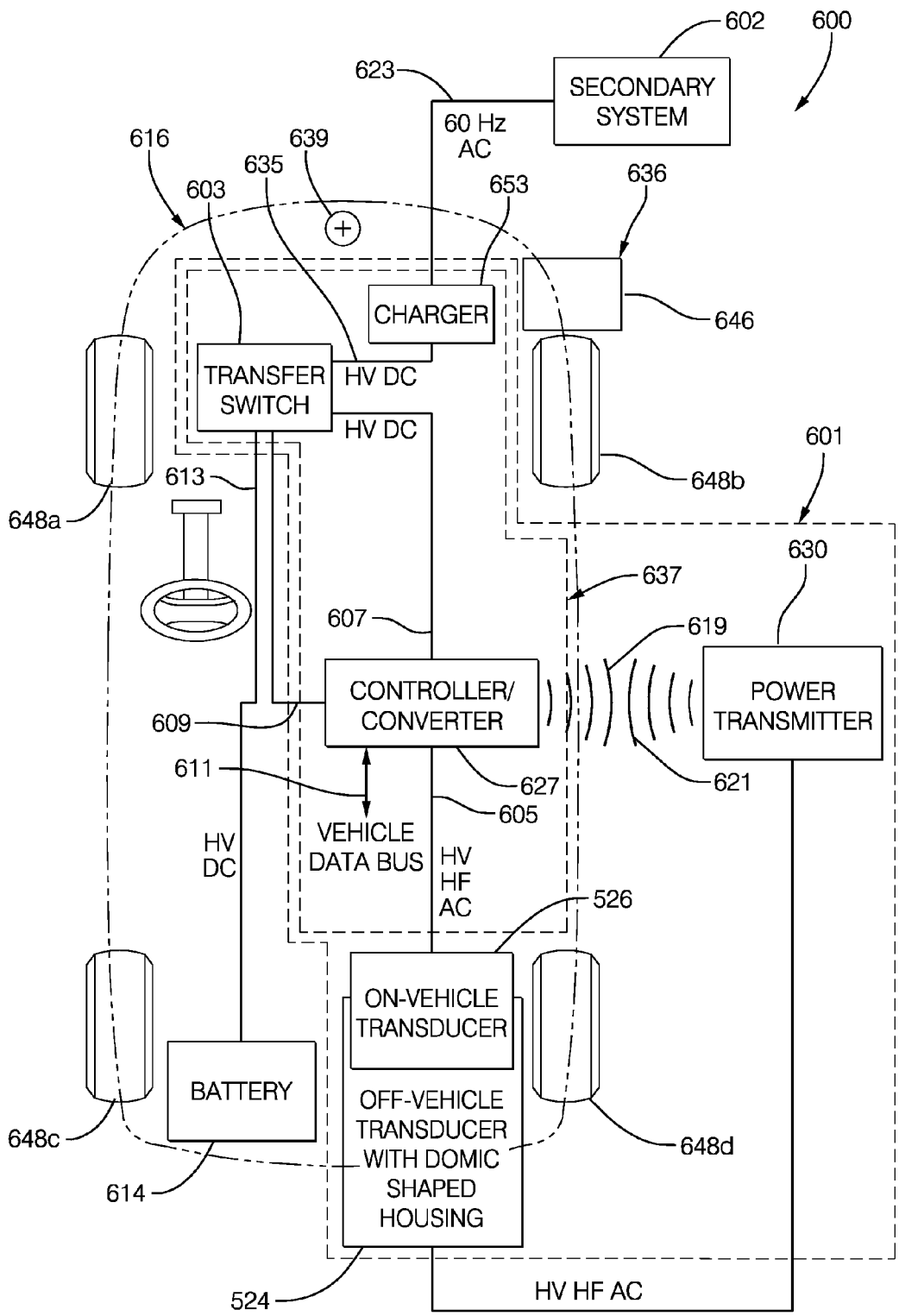
FIG. 10 shows an electrical charging system to electrically charge an energy storage device disposed on a vehicle that includes a primary electrical charging system and a secondary electrical charging system in which the primary electrical charging system contains a source resonator that contains a convex shaped cover, according to yet another alternative embodiment of the invention.

Referring to FIG. 10, yet another embodiment of the invention an electrical charging system 600 includes a primary electrical charging system 601 and a secondary electrical charging system 602. Primary electrical charging system 601 is generally a high voltage, high frequency electrical charging system and secondary electrical charging system is generally a lower voltage, lower frequency electrical charging system. The primary electrical charging system operates at a frequency that is greater than the 60 Hz secondary electrical charging system.

Figure 9:
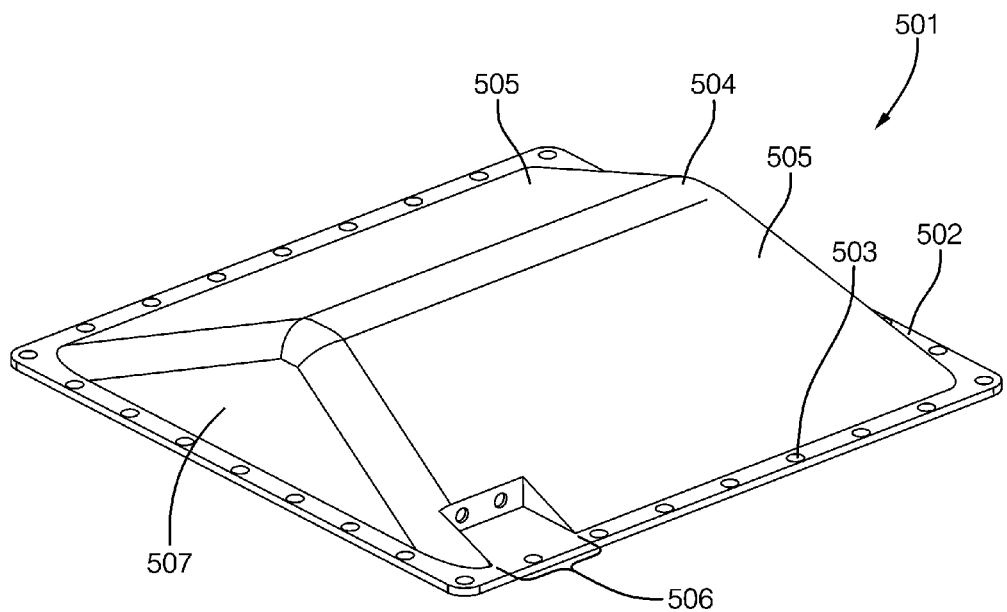
FIG. 9A shows a top view of an external surface of a housing used for a source resonator having a convex inverted V-shape according to yet a further alternative embodiment of the invention.
FIG. 9B shows a bottom view of the convex inverted V-shaped housing of FIG. 9A, and details thereof.
Figure 9:
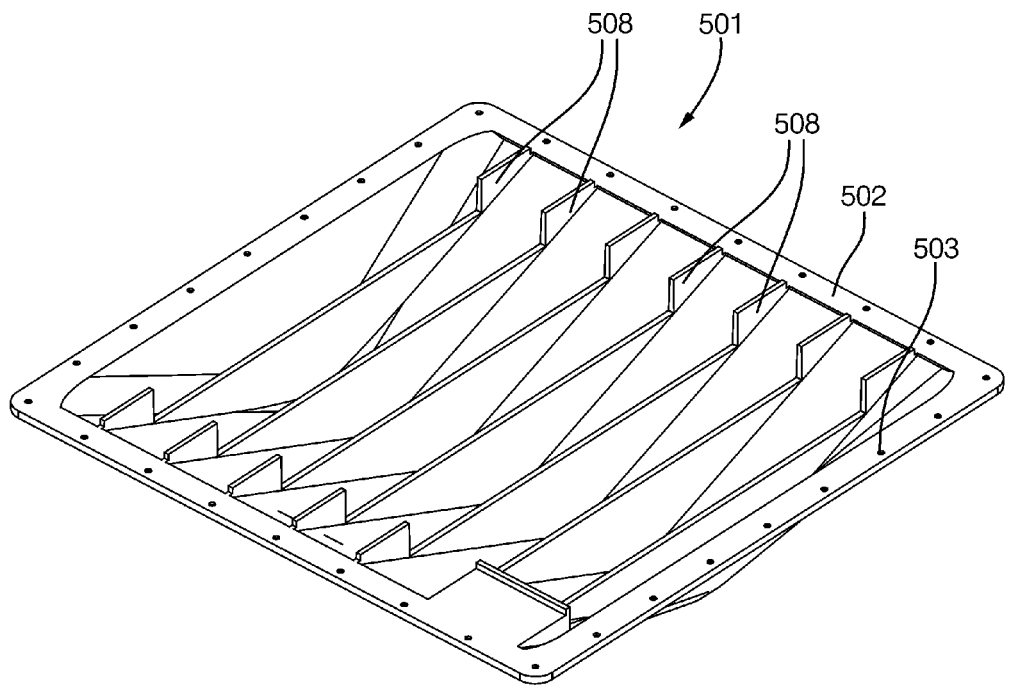

To better understand the electrical signals as designated on the electrical signal paths illustrated in FIG. 9, the following definitions apply:

60 Hz AC—A 60 Hz, AC voltage electrical signal. Generally, the AC voltage is either 120 VAC or 240 VAC dependent on the power source generating the voltage.

HV HF AC—A high voltage, high frequency alternating current (AC) electrical signal. Preferably, the voltage signal is greater than 120 VAC and the frequency of the voltage signal is greater than 60 Hz. The frequency may be in a range of 10 kHz to 450 kHz.

HV DC—A high voltage, direct current (DC) electrical signal. Preferably, the DC voltage is greater than 120 VDC.

Primary electrical charging system 601 includes a source resonator 524 that includes a convex shaped cover having the advantageous features as previously described herein in previous embodiments. Similar elements in the embodiment of FIG. 9 as the embodiment of FIGS. 2 and 4 have reference numerals that differ by 500. In contrast to electrical charging system 10, electrical charging system 600 shows another type of electrical charging system configuration that includes primary electrical charging system 601 which contains an electrical signal shaping device 637 and an integrated charger 653 that is different from electrical signal shaping device 32 and the vehicular charger of electrical charging system 10 in the embodiment of FIG. 4. More particularly, electrical signal shaping device 637 includes a controller/convertor 627 in electrical downstream communication with a transfer switch 603 through electrical output 607. Integrated charger 653 is also in downstream electrical communication with transfer switch 603. Transfer switch 603 is in direct electrical communication with battery 614 via electrical output 613. There is no wireless volt meter electrical device (not shown) or ballast resistor electrical device (not shown) or inverter electrical device (not shown) in contrast with electrical charging system 10 in the embodiment of FIG. 4. The functionality of the wireless voltmeter is integrated in with the controller portion of controller/converter block 627. Thus, with electrical charging system 600, primary electrical charging system 601 is a more simplified electrical charging system approach that may allow for electrical charging system power efficiency improvements. Electrical charging system 600 may also allow for a more precise control in the electrical charging of battery 614. Alternatively, the controller portion of the controller/convertor may electrically communicate with the integrated charger when the integrated charger is included as part of the primary electrical charging system. Primary electrical charging system 601 operates with high voltages at a frequency that is greater than 60 Hertz (Hz).

A first frequency of a first electrical current input along signal path 605 to controller/convertor 627 of primary electrical charging system 601 has a greater frequency value than a second frequency of a second electrical current carried on output 623 from secondary electrical charging system 602 to integrated charger 653. An electrical signal output from integrated charger 653 is received by transfer switch 603. Controller/convertor 627 may measure voltage, current and power similar to the embodiment of FIG. 4. Wireless signal paths 619, 621 transmit data to ensure primary electrical charging system 601 operates at optimal system efficiency. Signal path 609 operates the state of transfer switch 603. An extension of the alignment means presented in the embodiment of FIG. 4 may be a secondary aligning means, such as a tennis ball 639, to further assist to position vehicle 516 so that source and capture resonators 524, 526 are in alignment so as to operationally perform the transfer of magnetic energy there between. Optimally, source and capture resonators 524, 526 may be in physical, axial alignment similar to the embodiment of FIG. 4. Alternatively, the source and capture resonators may not be in axial alignment and the primary electrical charging system may still effectively operate. Wireless signal paths 621 may also transmit sensor data as described in the embodiment of FIG. 9. Vehicle data bus 611 transmits vehicular information, such as the current charging level of the battery to controller/convertor 627. Secondary electrical charging system 602 provides a 60 Hertz (Hz) electrical charging option for an operator of electrical charging system 600 to advantageously provide further charging convenience for the operator. Having a 60 Hz secondary system that may operate from a power source of 120 VAC and a greater than 60 Hz primary system that may operate from a power source of greater than 120 VAC provides different electrical charging options for the operator that may be available dependent on where the vehicle is operated. One such secondary system is further described in U.S. patent application Ser. No. 12/950, 298 entitled "BATTERY CHARGER HAVING NON-CONTACT ELECTRICAL SWITCH" filed on 19 Nov. 2010 and published as U.S. Patent Publication No. 2012/0126747 which is incorporated by reference in its entirety herein.

Alternatively, the convex shaped cover may be employed for use with the capture resonator.

In a further alternative embodiment, the convex-shape of the housing may have any type of base shape in combination with any type of convex shape and still be within the spirit and scope of the invention.

In still another alternative embodiment, the convex shaped cover may be deployed with any type of apparatus especially where a space is needed to be taken up by the volume otherwise filled by the convex shaped cover.

In yet another alternative embodiment, the overall size of the housing may be tailored to suit the apparatus in which the housing is employed.

In a further alternative embodiment, any type of device or apparatus that needs animal deterrence, especially spatial animal deterrence in relation to another device, may find the convex shaped cover useful. The convex shaped cover may be constructed to be mountable to any type of solid material.

Still alternatively, the capture resonator may be disposed along any portion of the vehicle along the length L of the vehicle.

In yet another alternative embodiment, if the capture resonator is recessed above the lower level of the undercarriage, the additional space created thereat may be filled with a filling material such that animal deterrence is still effective with the convex shaped cover. The filling material, for example, may be formed of a plastic material or be a plastic panel that prevents the space from being occupied by the animal.

Thus, a robust, convex shaped cover associated with a source resonator prevents animals and foreign objects from entering or remaining in this space intermediate the source and capture resonators to enable maximum energy transfer efficiency between the source and capture resonators. The convex shaped cover may be formed of a structural foam material or be molded from a thermoplastic material in a mold in a single molding process operation as a unitary piece. The convex shaped cover is easily installed to a second housing portion of the source resonator using fasteners or adhesive. The peak point has a sufficient height that allows the convex shaped cover to be within tolerances of the ground clearance of the vehicle but discourage and prevent at least a portion of an animal's body from being located in a space disposed intermediate the external surfaces of the convex shaped cover and the capture resonator when at least a portion of the convex shaped cover underlies the undercarriage of the vehicle. The convex shaped cover may be driven over with a tire of the vehicle and not break, especially when constructed from a structural foam material. The housing may be formed for deployment to cover a top portion or a majority portion of the source resonator elements which is dependent on the animal/foreign object deterrence area needed in a given electrical charging system application. When the convex shaped cover covers a majority portion of the source resonator, the animal is discouraged from also residing adjacent the external surfaces along the sides of the source resonator. The convex shaped cover may be equipped with sensors to sense movement or applied pressure from either a foreign object or an animal making contact with the convex shaped cover and communicate an electrical signal that the electrical charging system receives and interprets so as stop the electrical charging system from electrically charging the battery. The electrical charging system may be further equipped to resume electrical charging when the foreign object/animal condition has cleared. The convex shaped cover may be utilized in any electrical charging system that has a source resonator where animal/foreign object deterrence is desired. In general, the convex shaped cover may be deployed with any type of apparatus where animal/foreign object deterrence is needed and may be formed in a manner that allows deployment on many different apparatus shapes and sizes. The convex-shape of the housing may take on any type of special shape as determined by an application of use.

While this invention has been described in terms of the preferred embodiment thereof, it is not intended to be so limited, but rather only to the extent set forth in the claims that follow.

It will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. A source resonator configured for use with a wireless electrical charging system, said source resonator comprising:
    a base configured to be attached to a parking surface;
    a convex shaped cover overlying the base and defining a cavity within; and
    a first wire coil disposed within the cavity and configured to transmit magnetic energy to a second wire coil remote from the first wire coil, wherein a height of an apex of said convex shaped cover is less than a ground clearance height of a motor vehicle to which the second wire coil is mounted.

2. The source resonator of claim 1, wherein the ground clearance height of the motor vehicle is between 10 and 25 centimeters.

3. The source resonator of claim 1, wherein the convex shaped cover is a unitary piece.

4. The source resonator of claim 1, wherein the convex shaped cover is characterized as having an arcuate shape.

5. The source resonator of claim 1, wherein the convex shaped cover is characterized as having four triangular surfaces, each triangular surface having two arcuate sides.

6. The source resonator of claim 1, wherein the convex shaped cover is characterized as having two trapezoidal surfaces one opposite the other and having two triangular surfaces each adjacent the two trapezoidal surfaces and opposite one other.

7. The source resonator of claim 6, wherein the convex shaped cover is characterized as having two rectangular surfaces one opposite the other and having two triangular surfaces each adjacent the two rectangular surfaces and opposite one other.

8. The source resonator of claim 1, wherein the convex shaped cover is formed of a material sufficiently strong to support a force exerted by one tire of the motor vehicle without damage of the convex shaped cover.

9. The source resonator of claim 1, wherein the convex shaped cover is formed of a structural foam.

10. The source resonator of claim 1, further comprising a sensor configured to detect at least one of conditions selected from a list of:
    detect a metallic object disposed on said convex shaped cover, and
    detect a pressure applied to said convex shaped cover.

11. A wireless electrical charging system configured to wirelessly charge a battery in a vehicle having a capture resonator, said electrical charging system wireless comprising:
    the source resonator of claim 10, wherein the electrical charging system wireless stops charging the battery when at least one of the conditions is detected by the sensor.

12. The source resonator of claim 1, wherein a space between the convex shaped cover and an underside of the motor vehicle is too small for a dog to enter said space.

13. The source resonator of claim 12, wherein the space between the convex shaped cover and an underside of the motor vehicle is too small for a cat to enter said space.

14. The source resonator of claim 1, wherein the convex shaped cover is shaped such that a soda can will slide off the convex shaped cover.

15. The source resonator of claim 1, wherein the convex shaped cover is shaped such that a wrench will slide off the convex shaped cover.

16. The source resonator of claim 1, wherein a distance between the convex shaped cover and an underside of the motor vehicle is about 2 centimeters.

* * * * *